(12) United States Patent
Baradaran Hashemi et al.

(10) Patent No.: US 12,711,431 B2
(45) Date of Patent: Aug. 18, 2026

(54) SUGGESTING RESOURCES USING A LATENCY-EFFICIENT MACHINE-TRAINED RANKING MODEL

(71) Applicant: Microsoft Technology Licensing, LLC, Redmond, WA (US)

(72) Inventors: Homa Baradaran Hashemi, Kirkland, WA (US); Bing Li, Seattle, WA (US); Wenjin Xu, Bothell, WA (US); Upul Asanka Samarawickrama Liyanage, Kirkland, WA (US); Simerpreet Kaur, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 426 days.

(21) Appl. No.: 18/369,064

(22) Filed: Sep. 15, 2023

(65) Prior Publication Data

US 2025/0094882 A1 Mar. 20, 2025

(51) Int. Cl.
*G06N 20/20* (2019.01)

(52) U.S. Cl.
CPC .................................... *G06N 20/20* (2019.01)

(58) Field of Classification Search
CPC ...................................................... G06N 20/20
See application file for complete search history.

(56) References Cited

U.S. PATENT DOCUMENTS 8,645,417 B2 2/2014 Groeneveld et al.
9,727,639 B2 8/2017 Groeneveld et al.
2007/0260595 A1 11/2007 Beatty et al.
2024/0296373 A1* 9/2024 Sommerlade .......... G06N 3/045

OTHER PUBLICATIONS

"Cheat sheet: How to choose a MicrosoftML algorithm," available at https://learn.microsoft.com/en-us/machine-learning-server/r/how-to-choose-microsoftml-algorithms-cheatsheet, Microsoft Corporation, Redmond, WA, Jul. 12, 2022, 5 pages.
Coadou, Yann, "Boosted decision trees," arXiv, arXiv:2206.09645v1 [physics.data-an], Jun. 20, 2022, 46 pages.

(Continued)

*Primary Examiner* — Ajith Jacob

(57) ABSTRACT

A technique suggests resources within a particular environment. The technique operates by receiving a query via a search interface presentation, and using a prefix tree data structure to retrieve candidate resource descriptors that match the query. The candidate resource descriptors are data items that describe different types of candidate resources. The technique further includes: generating feature information that describes the candidate resource descriptors; using a machine-trained ranking model to generate scores associated with the candidate resource descriptors, based on the feature information; sorting the candidate resource descriptors based on the scores, to provide sorted resource descriptors; and generating output information that represents a selected set of resource descriptors drawn from the sorted resource descriptors, for presentation via the search interface presentation. In some implementations, the machine-trained model is a boosted decision tree model optimized to achieve a desired accuracy and latency.

20 Claims, 9 Drawing Sheets

(56) References Cited

OTHER PUBLICATIONS

"Learning to rank," available at https://en.wikipedia.org/wiki/Learning_to_rank, Wikipedia article, accessed on Sep. 9, 2023, 18 pages.

Ji, et al., "Efficient Interactive Fuzzy Keyword Search," in WWW '09: Proceedings of the 18th international conference on World Wide Web, Apr. 2009, pp. 371-380.

Burges, Christopher J.C., "From RankNet to LambdaRank to LambdaMART: An Overview," available at https://www.microsoft.com/en-us/research/wp-content/uploads/2016/02/MSR-TR-2010-82.pdf, Microsoft Research Technical Report MSR-TR-2010-82, 19 pages.

Casalegno, Francesco, "Learning to Rank: A Complete Guide to Ranking using Machine Learning," available at https://towardsdatascience.com/learning-to-rank-a-complete-guide-to-ranking-using-machine-learning-4c9688d370d4, in Towards Data Science, Feb. 28, 2022, 18 pages.

"Overview of Microsoft Search", available at https://learn.microsoft.com/en-us/microsoftsearch/overview-microsoft-search, Microsoft Corporation, Redmond, WA, Mar. 30, 2022, 5 pages.

Svore, et al., "Large-scale Learning to Rank using Boosted Decision Trees," available at https://www.microsoft.com/en-us/research/wp-content/uploads/2016/02/suml10_submission_20.pdf, accessed on Sep. 9, 2023, 44 pages.

"Boosted Decision Tree Regression component," available at https://learn.microsoft.com/en-us/azure/machine-learning/component-reference/boosted-decision-tree-regression?view=azureml-api-2, Microsoft Corporation, Redmond, WA, Jul. 5, 2022, 4 pages.

* cited by examiner

802

OVERVIEW OF OPERATION OF THE TRAINING SYSTEM 802

PRODUCE PLURAL CANDIDATE MODELS BASED ON A SET OF TRAINING EXAMPLES, EACH HAVING A PARTICULAR NUMBER OF COMPONENT CLASSIFICATION MODELS AND A PARTICULAR TREE DEPTH.
804

↓

ASSESS A PREDICTION TIME AND AN ACCURACY OF EACH CANDIDATE MODEL, TO PROVIDE TEST RESULTS, THE PREDICTION TIME DESCRIBING AN AMOUNT OF TIME THAT IS REQUIRED TO MAP THE FEATURE INFORMATION TO AN OUTPUT RESULT.
806

↓

RANK THE CANDIDATE MODELS BASED ON PREDICTION TIMES AND ACCURACIES ASSOCIATED WITH THE CANDIDATE MODELS, AND SELECT A CANDIDATE MODEL THAT IS RANKED AS MOST OPTIMAL.
808

FIG. 8

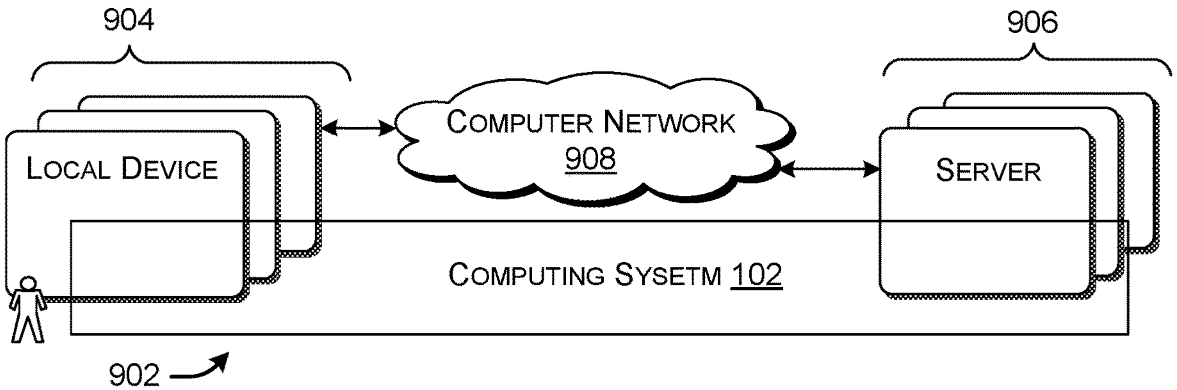

FIG. 9

SUGGESTING RESOURCES USING A LATENCY-EFFICIENT MACHINE-TRAINED RANKING MODEL

BACKGROUND

An enterprise environment provides a heterogeneous collection of resources that are available for use by members of the environment. In one approach, a system uses manually-derived rules for each type of resource that govern how the resources of that type are identified and retrieved. In some cases, the system also provides application-specific search interfaces for interacting with different kinds of resources. This solution is unreliable, not readily scalable, and resource inefficient. For instance, this approach makes inefficient use of resources because it requires maintenance of plural ad hoc rule sets.

SUMMARY

A technique is described for suggesting resources within a particular environment, e.g., an enterprise environment. In some implementations, the technique includes receiving a query that is input via a search interface presentation. The technique then uses a prefix tree data structure to retrieve candidate resource descriptors that match the query. The candidate resource descriptors are data items that describe candidate resources available within the particular environment. The candidate resources, in turn, are drawn from plural heterogeneous groups of resources. The technique further includes: generating feature information that describes the candidate resource descriptors; using a machine-trained ranking model to generate scores associated with the candidate resource descriptors, based on the feature information; sorting the candidate resource descriptors based on the scores, to provide sorted resource descriptors; and generating output information that represents a selected set of resource descriptors drawn from the sorted resource descriptors, for presentation via the search interface presentation.

In some implementations, the technique is performed by a local system, e.g., a local computing device.

In some implementations, the technique is agnostic to an application which hosts the search interface presentation. That is, plural applications host different search interface presentations that provide access to the same program logic used by the technique. One such application is a general-purpose search utility provided by an operating system of the local system. Another application is a browser application.

In some implementations, the heterogeneous groups of resources include: files available within the particular environment; people associated with the particular environment; bookmarks for selected sites accessible to members associated with the particular environment; applications available for use within the particular environment, and so on.

In some implementations, the feature information for a particular resource descriptor includes: at least one feature that describes an extent to which the query matches the particular resource descriptor; at least one feature that describes a resource type of a particular resource that is associated with the particular resource descriptor; and at least one feature that describes any other characteristic of the particular resource other than its resource type.

In some implementations, the machine-trained ranking model is a gradient boosted decision tree model that includes an ensemble of plural component decision trees. In some implementations, a number and a depth of the component decision trees is selected to provide a target accuracy and latency.

The technique is technically advantageous because it provides an accurate and scalable way to compare the relevance of resources across different classes of resources, without resorting to ad hoc application-specific rules. The technique also makes efficient use of memory and processor-related resources, and provides low-latency performance. The efficiency and low-latency characteristics of the technique stem, in part, from its use of a lightweight ranking model having a reduced number of component classification models and a reduced tree depth.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 8 is a flowchart that provides an overview of one manner of operation of the training system of FIG. 6.

FIG. 9 shows computing equipment that, in some implementations, is used to implement the computing system of FIG. 1 and the training system of FIG. 6.

The same numbers are used throughout the disclosure and figures to reference like components and features.

DETAILED DESCRIPTION

A. Overview of the Computing System

Figure 1:
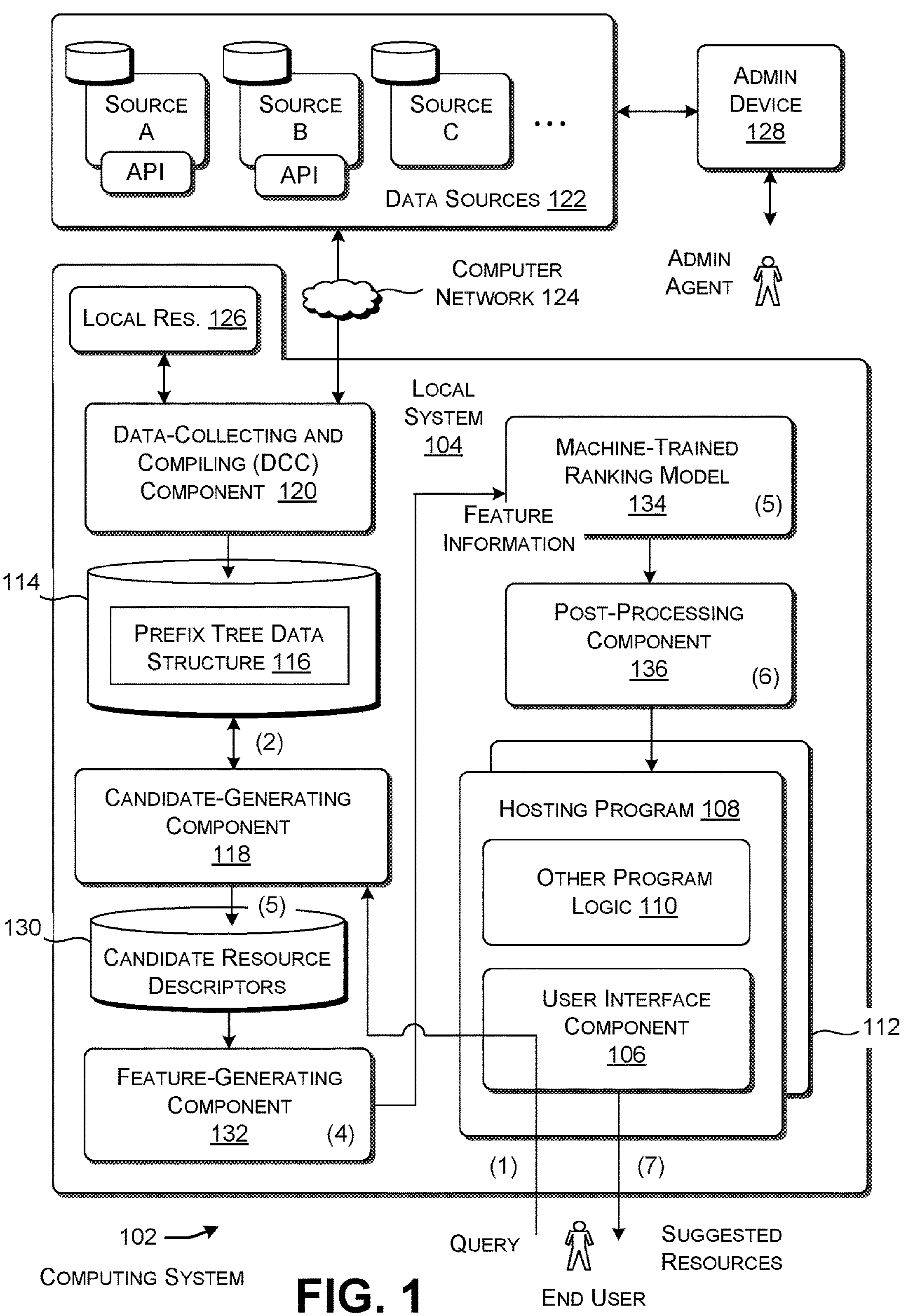
FIG. 1 shows a computing system for suggesting resources to users in a particular environment, e.g., a particular enterprise environment.

FIG. 1 shows a computing system 102 for suggesting resources to users in a particular environment. In some cases, the particular environment is an enterprise environment, e.g., associated with a company or other type of organization. In other cases, the particular environment is a local system associated with a particular user, family, or other group of users.

In some examples, a "resource" refers to any asset that serves a role within the particular environment. A non-exhaustive list of possible resources include files, programs, bookmarks (e.g., uniform resource locators (URLs)), settings, locations, people, search queries, question-and-answer pairs, etc. For example, one resource is a document file that is accessible to at least some members of a particular enterprise environment. Another resource is information regarding a particular employee of the enterprise environment. Another resource is a particular conference room available within the enterprise environment. Another resource is a computer setting that is available to at least one computing device within the enterprise environment, and so on.

In some examples, a "resource descriptor" is any string that describes a resource. The string include one or more words. For example, a resource descriptor for a document file can be chosen to be the same as name of the file, or a title of the document's content, a keyword associated with the file, or any other description. In many cases, a resource descriptor for an individual corresponds to the name of that individual.

Figure 10:
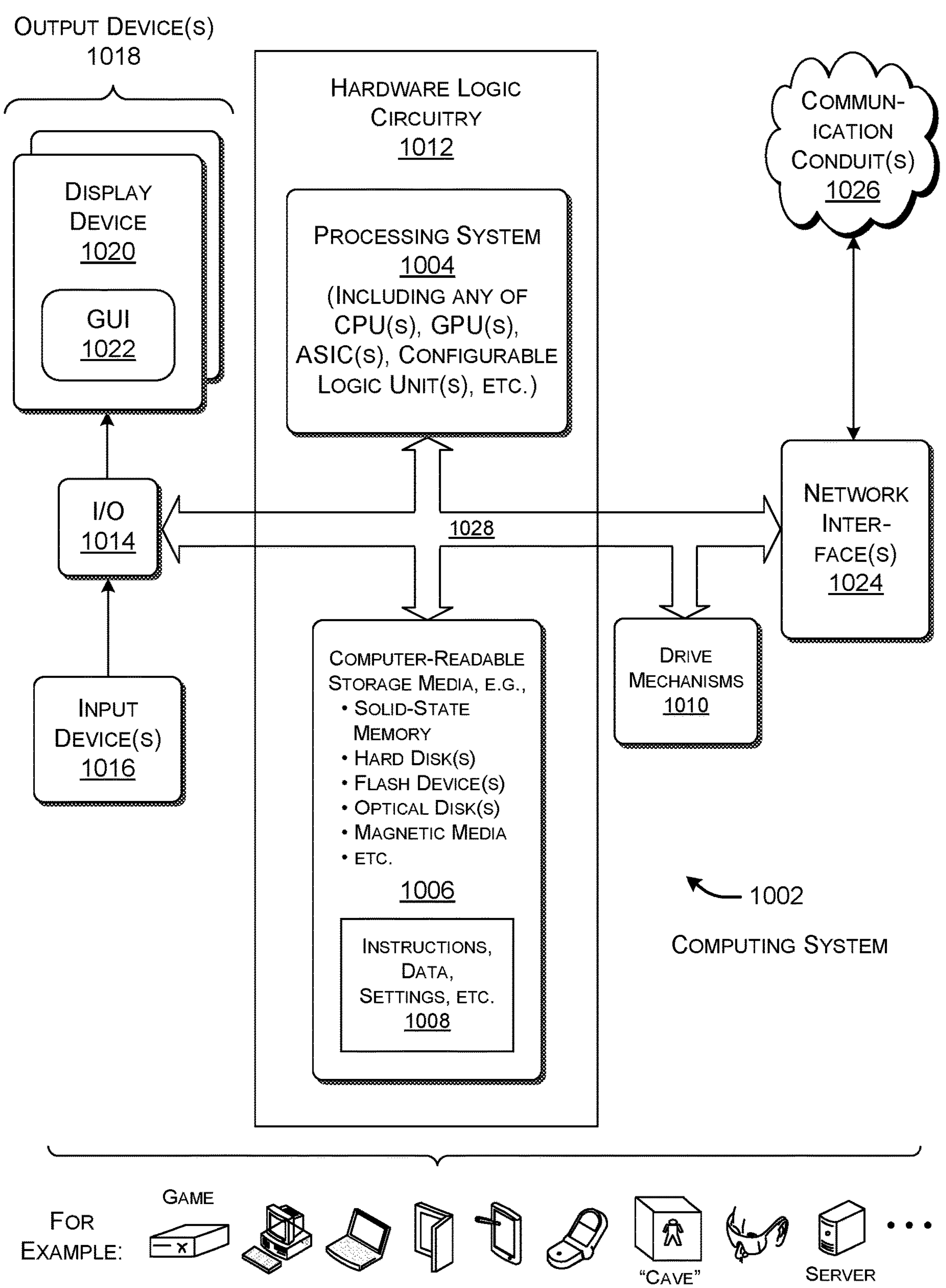
FIG. 10 shows an illustrative type of computing system that, in some implementations, is used to implement any aspect of the features shown in the foregoing drawings.

More generally, in some examples, a "machine-trained model" refers to computer-implemented logic for executing a task using machine-trained weights that are produced in a training operation. A "weight" refers to any type of parameter value that is iteratively produced by the training operation. In some contexts, terms such as "component," "module," "engine," and "tool" refer to parts of computer-based technology that perform respective functions. FIGS. 9 and 10, described below, provide examples of illustrative computing equipment for performing these functions.

In some examples, the computing system 102 uses a local system 104 to perform some or all of the retrieval functions described herein. In some examples, the local system 104 is a local computing device of any type. One type of local system is a personal computing device that is designed to operate in a stationary manner. Another type of local system is a mobile computing device (e.g., a smartphone or laptop computing device). In other cases, the local system includes plural local computing devices coupled together via a local computer network. Performing the functions on the local system 104 is advantageous because: a) it reduces request-to-response latency; b) it enables the local system 104 to operate in an offline manner in which the network connection is not available or desired; and c) it helps assure the user that the user's transaction will be private.

The local system 104 provides a user interface component 106 that provides access to the resources of the particular environment via a search interface presentation. Further details regarding an illustrative search interface presentation is set forth below in conjunction with the description of FIG. 3. By way of overview, the user interface component 106 receives a query provided by the user. In response, the search interface presentation provides output information regarding a plurality of resources that are determined to match the query. In some examples, the plurality of matching resources is a heterogeneous collection of resources because the collection can include different types of resources.

In some examples, the local system 104 specifically functions as a query suggestion engine. In this context, the local system 104 identifies a matching set of resources upon entry of each character of the query by the user. For example, assume that a user wishes to retrieve information regarding the name of a person named "John Patterson" by entering the characters of this person's last name. The local system 104 identifies a first set of resources upon the user's entry of "P," a second set of resources upon the user's entry of "A," a third set of resources upon the user's entry of "T," and so on. Hence, a "query" is to be generally construed herein to refer any part of a series of characters associated with a word or phrase, including a part of the word or phrase or the entirety of the word or phrase.

In the example of FIG. 1, a hosting program 108 of any type provides the user interface component 106 and any other program logic 110. In some examples, the hosting program is a general-purpose search utility provided by the local system's operating system. In other examples, the hosting program 108 is a browser application that runs on the local system 104. In general, different hosting programs can use different application-specific user interface presentations to access the same retrieval functionality provided by the local system 104. For example, another hosting program 112 provides its own user interface component (not shown) that provides access to the same retrieval functionality as the hosting program 108. In this sense, the retrieval functionality is said to be agnostic to the application framework though which it is accessed. This characteristic is beneficial because it reduces the time and resources that go into maintaining the computing system 102 (compared to the alternative case in which each application hosts its own application-specific retrieval functionality). It is also beneficial because the user need only learn the search behavior of a single instance of retrieval functionality.

A data store 114 stores a prefix tree data structure 116, also known as a trie. The prefix tree data structure 116 is a hierarchical data structure that represents a particular string using a series of linked nodes associated with successive characters of the string. A candidate-generating component 118 matches a user's query with the particular string by successively tracing a path through the data structure, based on the characters in the query. Assume, for example, that the user intends to retrieve a resource associated with the name "Patterson." When the user types the letter "P," the candidate-generating component 118 will advance from a root node to a child node representing the character "P." When the user types the letter "A," the candidate-generating component 118 advances from the prior "P" node to a child node that represents the letter "A." When the user types the letter "T," the candidate-generating component 118 advances from the prior "A" node to a child node that represents the character "T," and so on. Each stage in the traversal defines a prefix. For example, after entry of the letter "T," the candidate-generating component 118 will have traced out the prefix "PAT."

A leaf node defines a terminal node associated with a particular string. For example, a leaf node is associated with the last character "N" of the name "Patterson." In some implementations, the prefix tree data structure 116 stores the resource descriptor associated with the leaf node, here, the string "Patterson." In other implementations, the leaf node includes a pointer to a separate data store where the resource descriptor is stored. For instance, the leaf node in the above-referenced example includes a pointer to the name string "John Patterson," which is provided in a separate data store.

A data-collecting and compiling (DCC) component 120 collects data items that pertain to different resources that are available within the particular environment, and updates the prefix tree data structure 116 to include resource descriptors associated with those resources. Further, the DCC component 120 updates the prefix tree data structure 116 on a periodic basis and/or on-demand basis. Possible triggering events that can trigger an on-demand update operation include opening the hosting program 108 or the creation or import of a new resource or the detection of an insufficient number of suggestions to present to a user when the user submits a query (described more fully below). More generally, in some examples, the DCC component 120 operates based on a pull strategy by actively interrogating available sources for the existence of new resources. Alternatively, or in addition, the DCC component 120 operates based on a push strategy, in which various sources proactively notify the DCC component 120 of the existence of new resources.

Some data sources are network-accessible data sources 122 available via a computer network 124. The sources are generically depicted in FIG. 1 as a source A, a source B, a source C, etc. At least one of these sources is accessible via an application programming interface (API). At least one of the data sources is associated with a data store. For instance, a data store provides resource descriptors associated with a particular data source's resources. The computer network 124 is a wide area network (e.g., the Internet) or a local area network (e.g., an enterprise-specific network). In addition, or alternatively, the DCC component 120 interacts with one or more local data sources 126. The local data sources 126 include assets that are locally stored by the local system 104, e.g., on a hard drive of a local computing device.

Assume that one of the sources is a program that maintains a social graph in a data store. The social graph includes nodes associated with entities. A link between a pair of nodes in the social graph represents a relationship between two individuals associated with those nodes. Another of the sources provides a repository of document files created by a word processing program. Another of the sources provides a repository of bookmarks associated with URLs, and so on. In some implementations, an administrative user ("admin agent") associated with the particular environment interacts with the network-accessible data sources 122 via a user computing device 128. For example, the administrative user interacts with the data sources 122 via the user computing device 128 to add new bookmarks to a data store of bookmarks, whereupon these bookmarks are made available to members of the particular environment. In this role, the administrative user controls which resources are tagged as enterprise-wide resources of potential interest to users conducting searches within a particular enterprise.

Assume that the local system 104 is a local computing device associated with a particular user. In some implementations, the prefix tree data structure 116 produced and maintained by the DCC component 120 identifies a collection of resources that is at least partially customized to the user. For example, the prefix tree data structure 116 stores only assets for which the user has permission to access. In this implementation, the DCC component 120 includes permission-checking functionality (not shown) which filters the resources within the particular environment to find that subset of relevant resources that are available to the user. In other implementations, the prefix tree data structure 116 is the same for all members of the particular environment, and is not customized for any particular user. Here, the user interface component 106 will provide an error message if the user attempts to click on a resource descriptor in the search interface presentation for which the user does not have access rights.

FIG. 1 is annotated with numbers in parentheses (n) that describe an illustrative sequence of retrieval operations performed by the local system 104. In a first operation (1), the user interface component 106 receives a query from the user. Again, the query can correspond to a series of characters provided by the user, and need not correspond to the complete word or phrase that the user has in mind. In a second operation (2), the candidate-generating component 118 interrogates the prefix tree data structure 116 to retrieve a set of candidate resource descriptors that match the query. In a third operation (3), the candidate-generating component 118 stores the descriptors in a data store 130. For example, for the query "Pat," the data store 130 stores at least the resource descriptor "John Patterson." Generally, the candidate resource identifiers are associated with a set of candidate resources.

In a fourth operation (4), a feature-generating component 132 generates feature information that describes the candidate resources. Section B provides further information regarding some of the features that make up the feature information. By way of overview, some of the features describe an extent to which the query matches each candidate resource descriptor. Other features describe the types of the candidate resources that are associated with the resource descriptors. Other features describe other characteristics of the resources (besides the types).

In an operation (5), a machine-trained ranking model ("ranking model") 134 transforms the features information into score information that provides a plurality resource-specific scores. That is, each score represents a relevance of a particular resource descriptor relative to other resource descriptors, across different classes of resources. Section C will provide further information regarding one implementation of the ranking model 134. By way of overview, in some implementations, the ranking model 134 provides an ensemble of component classification models. For example, the ranking model 134 is a gradient boosted decision tree that includes plural component decision trees. In some examples, the gradient boosted decision tree includes a particular number of component decision trees having a particular tree depth, which are chosen to satisfy target accuracy and prediction time (latency) metrics.

In operation (6), a post-processing component 136 selects a set of resource descriptors based on their scores. For example, the post-processing component 136 sorts the resources descriptors based on their scores, e.g., from most relevant (highest) to least relevant (lowest). The post-processing component 136 then selects the K resource descriptors having the highest (most favorable) scores, where K is an environment-specific parameter. In some examples, however, the post-processing component 136 will not choose any resource descriptor that has a score below a prescribed score threshold (e.g., 30 percent). Entities that have a score above another prescribed score threshold (e.g., 90 percent) are labeled as high-confidence resource descriptors.

In some cases, the post-processing component 136 will conclude that are an insufficient number of candidate resource descriptors that satisfy an environment-specific relevance rule. The local system 104 responds to this finding by prompting the DCC component 120 to collect additional resource descriptors from the data sources (122, 126) that may be relevant to the current query. The DCC component 120 integrates those new resource descriptors into the prefix tree data structure 116, to provide an updated prefix tree data structure 116. The local system 104 then repeats operations (2) through (6) based on the updated prefix tree data structure 116.

In operation (7), the user interface component 106 generates output information that represents the resource descriptors chosen by the post-processing component 136. The user interface component 106 then presents the output information via the search interface presentation.

Figure 2:
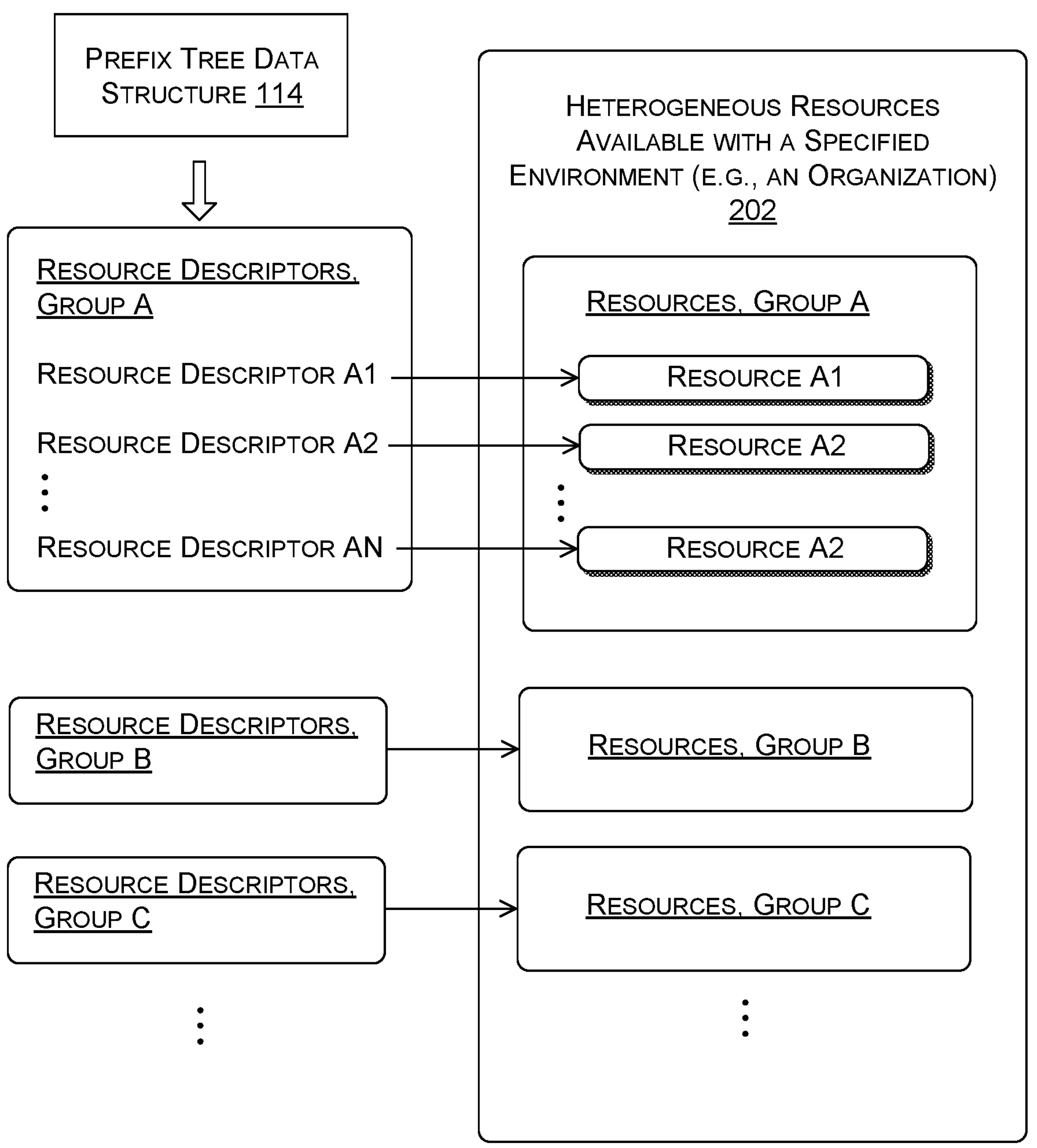
FIG. 2 shows a summary of heterogeneous resources available within the particular environment, and resource descriptors associated therewith.

FIG. 2 shows a summary of heterogeneous resources 202 available within the particular environment. The resources 202 include a first group of resources associated with a first type (A) of resources, a second group of resources associated with a second type (B) of resources, a third group of resources associated with a third type (C) of resources, and so on. As previously discussed, any resource can be provided at a location that is local with respect to the local system 104, or remote with respect to the local system 104 (e.g., as provided by the network-accessible sources 122). A resource descriptor is associated with each resource. The prefix tree data structure 116 stores these resource descriptors, or provides pointers that link to a separate data store that provides the resource descriptors.

Figure 3:
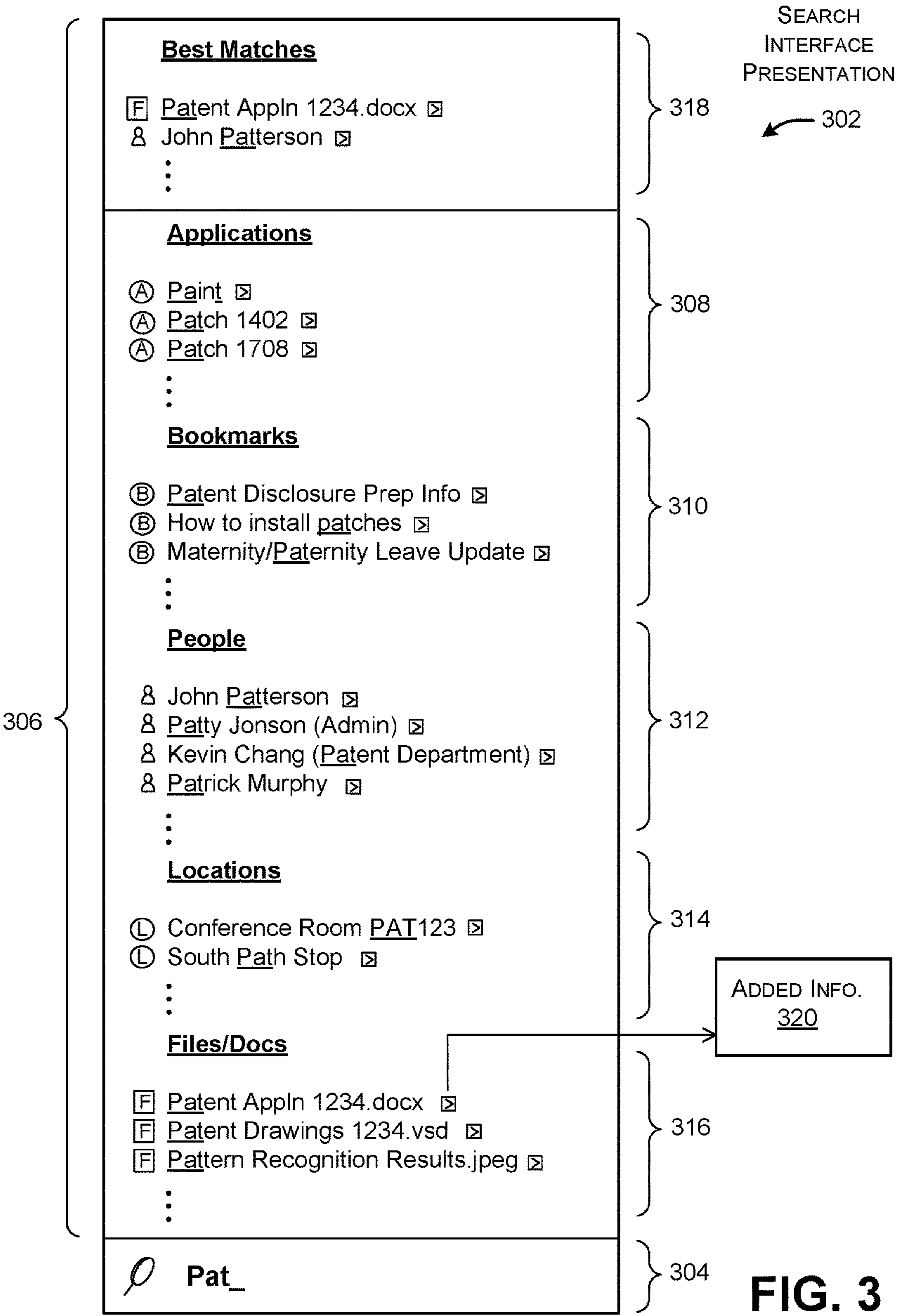
FIG. 3 shows a search interface presentation by which a user can provide an input query and receive output information, generating by the computing system of FIG. 1 in response to the query.

FIG. 3 shows an illustrative search interface presentation 302 provided by the user interface component 106. As described above, different hosting applications can provide the user interface components, including a general-purpose search utility provided by an operating system of the local system, a browser application, etc. The local system 104 enables access to the search interface presentation 302 using any type of input device.

The search interface presentation 302 includes a first section 304 for receiving a query. In the example of FIG. 3, the user has entered the first three letters ("PAT") of a name "Patterson," for which the user wishes to retrieve information. The user interface component 106 includes a second section 306 for presenting the output information produced by the user interface component 106. The output information lists the matching resource descriptors, or provides some other representation of these resource descriptors. In some implementations, the computing system 102 of FIG. 1 provides the output information within two seconds of the user entering each character of the query, and, in most cases, within a fraction of a second. More generally, the user perceives the response as real time or near real time.

In some examples, user interface component 106 organizes the matching resource descriptors in different resource group sections, e.g., by providing a first section 308 devoted to application-related resources, a second section 310 devoted to bookmarks, a third section 312 devoted to people, a fourth section 314 devoted to locations, a fifth section 316 devoted to files, a sixth section devoted to settings (not shown), and so on. However, note that computing system 102 ranks all of the resource descriptors in a single process, in which different types of resources are compared against each other. The feature-generating component 132 enables this manner of operation, in part, by capturing feature information that characterizes the type of each resource associated with a candidate resource descriptor. An optional "Best Matches" section 318 provides output information regarding a prescribed number of top-ranking resources. These sections are illustrative; other implementations can vary the organization of these sections, use additional sections, and/or omit one or more of the sections described above.

In some implementations, the search interface presentation 302 includes graphical controls associated with the respective resource descriptors. For example, a resource descriptor associated with a word processing document includes a graphical control located next to it. In response to a user's activation of the graphical control, the computing system 102 provides additional information 320 (e.g., metadata) about the word processing document associated with the resource descriptor. The additional information 320 also provides a link by which the user may access the word processing document. Overall, the search interface presentation 302 expedites and facilitates a user's access to available resources within the particular environment.

B. Illustrative Prefix Tree Data Structure

Figure 4:
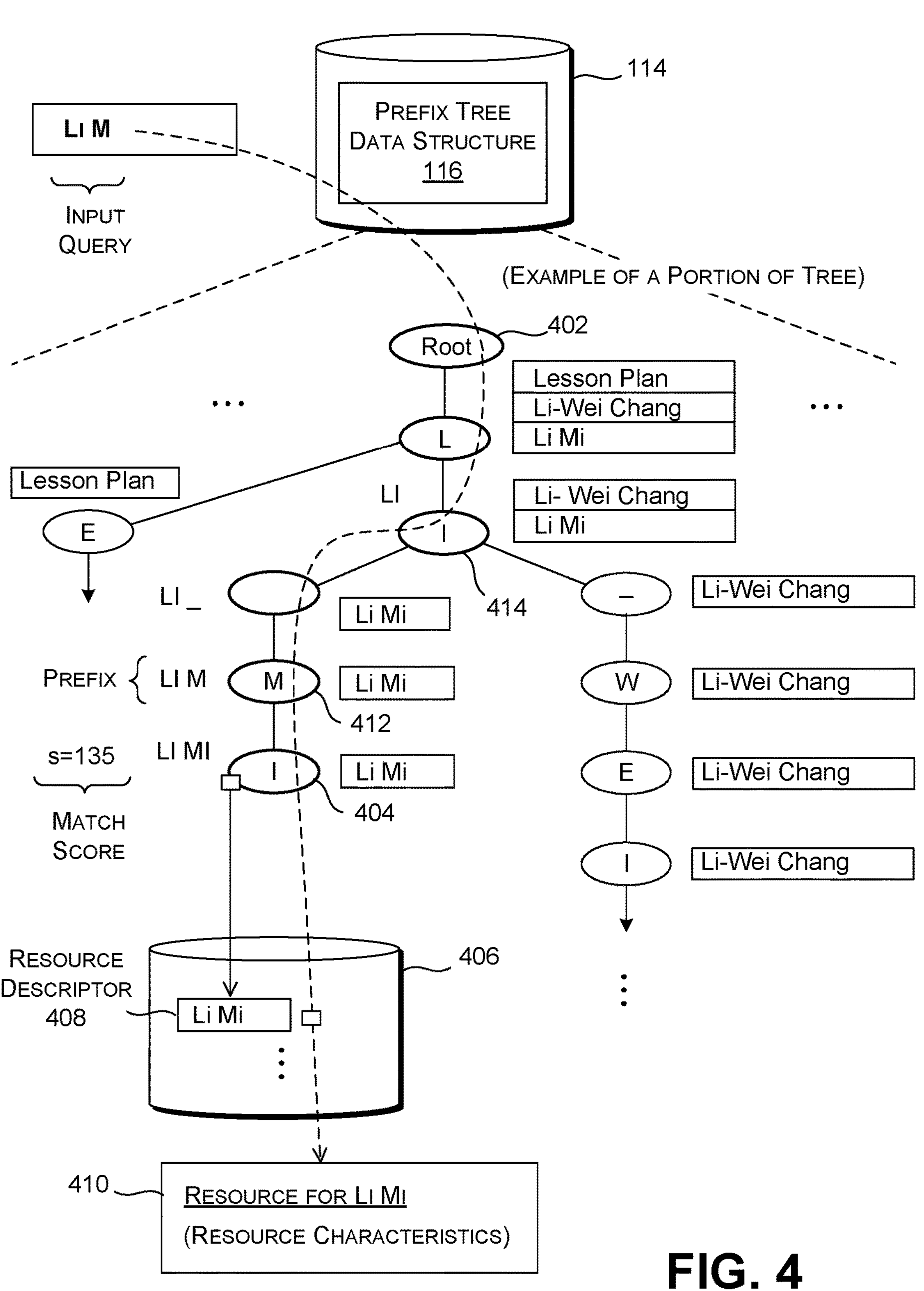
FIG. 4 shows illustrative details of a prefix tree data structure provided by the computing system of FIG. 1.

FIG. 4 shows a small illustrative sample of the prefix data structure 116. Generally, the prefix tree data structure 116 includes a plurality of nodes associated with individual characters. Each path of nodes through the prefix tree data structure 116 begins with a root node 402 and ends with a particular leaf node, such as representative leaf node 404.

Each leaf node contains a resource descriptor associated with a resource, or provides a reference to a resource descriptor provided in a separate data store. For example, assume that the leaf node 404 is associated with a resource descriptor 408 provided in a separate data store 406. More specifically, assume that the leaf node 404 is associated with a particular name ("Li Mi"), and that the resource descriptor 408 provides this name. Further, in some cases, a resource descriptor contains a pointer which points to additional information regarding an associated resource. For example, the resource descriptor 408 provides a pointer which points to profile information 410 regarding the name "Li Mi." The profile information optionally also includes a link by which a user can contact this person, e.g., via Email, text, telephone, or videoconference.

Overall, the prefix tree data structure 116 includes nodes that represent a heterogeneous collection of resources. In the particular example of FIG. 4, the prefix tree data structure 116 represents a first string "Lesson Plan" pertaining to a particular document or a particular bookmark, and two strings ("Li Mi" and "Li-Wei Chang") associated with two individuals that are members of the particular environment. In actual practice, the prefix tree data structure 116 represents thousands, and potentially millions, of strings, and can represent any combination of different resources.

The candidate-generating component 118 retrieves a resource descriptor by following a path through the prefix tree data structure 116, starting with the root node 402. For example, assume that the user enters a query that includes the series of characters "Li M," with the intent of retrieving a resource descriptor associated with the name "Li Mi." the candidate-generating component 118 follows a path through the prefix tree data structure 116 that begins with the root node 402 and which ends with the a node 412 associated with the last-entered character "M." The node 412 also can be said to represent a prefix "Li M," which matches the query.

More specifically, a prefix associated with a leaf node is often an exact match of at least on portion of a resource descriptor associated with that leaf node. But this need not be the case. For example, the prefix "Li Mi" can point to a resource descriptor which is a variation of this name, such as a nickname or a more complete name. In other cases, the resource descriptor associated with a leaf node is empty. Here, the resource descriptor serves only as a pointer which points to the resource itself (e.g., a user profile associated with the person "Li Mi").

FIG. 4 further annotates each node with an indication of the subset of resource descriptors that are accessible via that node. For example, the particular node 414 is annotated with at least the names "Li-Wei Chang" and "Li Mi," because the resource's descriptors associated with those names are accessible by following the chain of child nodes that descend from the node 414. In some examples, the retrieval functionality of the computing system 102 will present these resource descriptors to a user who enters "Li," assuming that the post-processing component 136 concludes that these resource descriptors are relevant to the user's query. The candidate-generating component 118 performs this task by finding a node associated with the user's query, and identifying the leaf nodes which are reachable from that node by performing a search through the prefix tree data structure 116.

In some implementations, the candidate-generating component 118 also explores paths through the prefix tree data structure 116 that represent misspellings and other variations of the query entered by the user. For example, when the user enters "Li," the candidate-generating component 118 also explores the branch of the prefix tree data structure 116 that leads to the resource descriptor "Lesson Plan." In some examples, the candidate-generating component 118 associates a transition score to each transition from one node to another node. A transition probability associated with a misspelling is smaller than a transition probability associated with a spelling that matches the query. With this provision, the candidate-generating component 118 can be said to accommodate fuzzy or inexact matching between a query and candidate resource descriptors.

In some implementations, the candidate-generating component 118 provides a tree score that specifies a probability associated with a candidate resource descriptor, given the query entered by the user. For example, the candidate-generating component 118 associates a tree score of s=135 for the leaf node 404, given that the user has entered the query "Li M." In some examples, the candidate-generating component 118 calculates the score associated with a particular node as a combination of the transition probabilities that led to the particular node. One implementation of fuzzy matching is described in commonly-assigned U.S. Pat. No. 8,645,417 to Groeneveld, et al., which issued on Feb. 4, 2014. The technique described therein computes a consolidated score by multiplying individual probability scores together, as given by $(1-\Pi(1-p_i))$, where $p_i$ refers to an individual transition probability associated with a transition between two nodes. The Groeneveld patent is incorporated herein by reference in its entirety.

C. Illustrative Feature Information

In a first case, an input query exactly matches a prefix represented by the prefix tree data structure 116, which, in turn, is associated with a particular node. In other cases, a query approximately matches a particular prefix represented by the prefix tree data structure 116. In other words, the local system 104 performs a fuzzy match between the query and a prefix. To facilitate explanation, however, the simplifying assumption is made in this section that the query is equivalent to a matching prefix in the prefix tree data structure 116.

A first set of features describes properties of the user's query per se, and/or a particular candidate resource descriptor per se that matches the query. For example, a first feature of this group describes the length of the query. A second feature of this group describes the length of the candidate resource descriptor. A third feature of this group specifies whether or not the candidate resource descriptor is empty (missing). A fourth feature of this group specifies whether or not the query includes two or more words. A fifth feature of this group specifies a number of words in the candidate resource descriptor.

A second set of features describes an extent to which the user's query matches the particular candidate resource descriptor. For example, a first feature of this group indicates whether the candidate resource descriptor contains the query. A second feature of this group more specifically indicates whether the candidate resource descriptor contains the query as a full word. A third feature of this group indicates whether the query equals the candidate resource descriptor in its entirety. A fourth feature of this group specifies an edit distance between the query and the candidate resource descriptor. A fifth feature of this group specifies an edit distance ratio, which is formed by dividing the edit distance by a value that is equal to: the length of the query minus the edit distance, plus the length of candidate resource descriptor. A sixth feature of this group provides an indication of whether the query corresponds to a full word of a multi-word candidate resource descriptor, or the entirety of the candidate resource descriptor. A seventh feature of this group specifies the length difference between the query and the candidate resource descriptor. An eighth feature of this group specifies any other distance metric between the query and the candidate resource descriptor, such as a Jaro-Winkler distance. A ninth feature of this group specifies a matching score of the node that matches the query, as given by the prefix tree data structure 116.

A third set of features is devoted to describing the type of the candidate resource that is associated with the candidate resource identifier. For example, a first feature of this group specifies whether the candidate resource is a bookmark. A second feature of this group specifies whether the candidate resource is a file. A third feature of this group specifies whether the candidate resource is a person. A fourth feature of this group specifies whether the candidate resource is a question-and-answer item (e.g., which provide a question commonly asked within the particular environment, and an answer to that question). A fifth feature of this group specifies whether the candidate resource is a building location. A sixth feature of this group specifies whether the candidate resource is associated with a group of individuals. A seventh feature of this group specifies whether the candidate resource is associated with an educational assignment. An eighth feature of this group specifies whether the candidate resource is an item from the user's history. A ninth feature of this group specifies whether the candidate resource has the status "external," meaning that it originates or is otherwise associated with a source that is external to the particular environment. A tenth feature of this group specifies whether the candidate resource is associated with an acronym. Other type-related features provide a more fine-grained description of a particular type of candidate resource. For example, the following resource-related features describe whether or not a file-related candidate resource is associated with any of: a WORD file, an EXCEL file, a POWERPOINT file, a PDF file, an OUTLOOK file, a TXT file, a ONENOTE file, or a catch-all "other" file type.

A fourth set of features describes temporal-related aspects of a candidate resource under consideration. For example, a first feature of this group specifies the last time the candidate resource was accessed (in days). A second feature of this group specifies the last time the candidate resource was modified. A third feature of this group specifies whether the day on which the query was submitted is a weekend. A fourth feature of this group specifies the hour of the day on which the query was submitted. A fifth feature of this group specifies whether there is no information available regarding that time/day that the candidate resource was last accessed.

A fifth set of features describes other characteristics of a candidate resource under consideration. For example, a first feature of this group specifies a length of a resource name (which may or may not be equivalent to the candidate resource descriptor to which the prefix tree data structure 116 links). A second feature of this group provides an indication of whether a candidate resource is trending. A trending resource refers to a candidate resource that has been accessed more than a prescribed number of times within a given timeframe, or meets some other environment-specific criterion of popularity.

A sixth set of features describes relationships between the query and various characteristics of the candidate resource under consideration. For instance, a first feature of this group specifies whether the query matches the first word of a title associated the candidate resource, such as a title of a document. A second feature of this group specifies the length of a portion of the title that matches the query. A third feature of this group specifies an edit distance between the query and the candidate resource's title. A fourth feature of this group specifies whether the query matches keyword information or other "teaser" information associated with the candidate resource. A fifth feature of this group specifies a distance between the person who has submitted the query and a person associated with a candidate resource under consideration. The sixth feature can be obtained from a social graph, e.g., as represented by a distance score associated with a link that connects the user and the other person. A seventh feature can more specifically characterize the relationship between the user and a sender of a particular Email or other form of communication.

The feature information described above is advantageous because it provides a flexible and scalable way of describing many different kinds of resources within a particular environment. Any specific implementation can select from among the above-noted features, omitting some of the features. In addition, or alternatively, any specific implementation can introduce additional features not mentioned above.

D. Illustrative Machine-Trained Ranking Model

Figure 5:
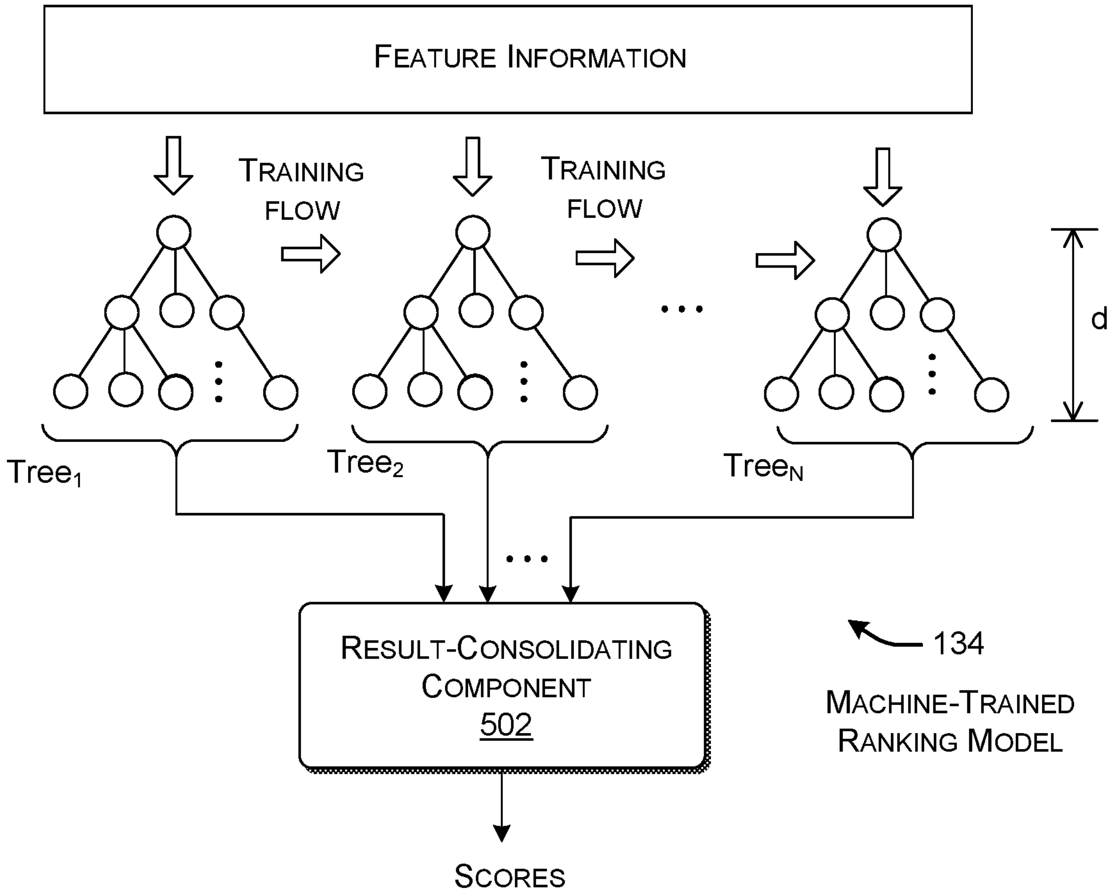
FIG. 5 shows an illustrative machine-trained ranking model for use in the computing system of FIG. 1.

FIG. 5 shows one implementation of the machine-trained ranking model ("ranking model") 134 that is used to transform the feature information into a plurality scores associated with the candidate resource descriptors, generally referred to as score information. In some examples, the ranking model 134 includes an ensemble of component classification models. In some implementations, for instance, the ranking model 134 is a gradient boosted decision tree that is associated with an ensemble of component decision trees, represented in FIG. 5 as a $\text{tree}_1$, a $\text{tree}_2$, . . . , and a $\text{tree}_N$. Each component decision tree maps the feature information to an instance of score information. A result-consolidating component 502 combines the plural instances of score information into a single instance of score information, e.g., by forming a sum of the individual instances of score information.

In general, a decision tree provides a hierarchical collection of nodes. Each node in the hierarchal collection of nodes performs a test for a candidate resource descriptor under consideration based on the feature information associated with the candidate resource descriptor. For example, assume that one node determines whether the resource associated with the candidate resource identifier is a file. Another node determines whether the edit distance between the query and the resource descriptor is below a prescribed threshold value. The decision tree transitions to a first child node if a test performed by a parent node is satisfied, and another child node if the test is not satisfied. A leaf node of the decision tree is associated with a particular conclusion. In the present context, the conclusion represents a score associated with the resource descriptor under consideration (in relation to the query that has been submitted).

The ranking model 134 is characterized by a number of properties. A first property specifies how many component classification models are included in the ranking model 134. For the case in which the ranking model 134 includes an ensemble of component decision trees, a second property describes the depth d of the component decision trees.

E. Illustrative Training System

Figure 6:
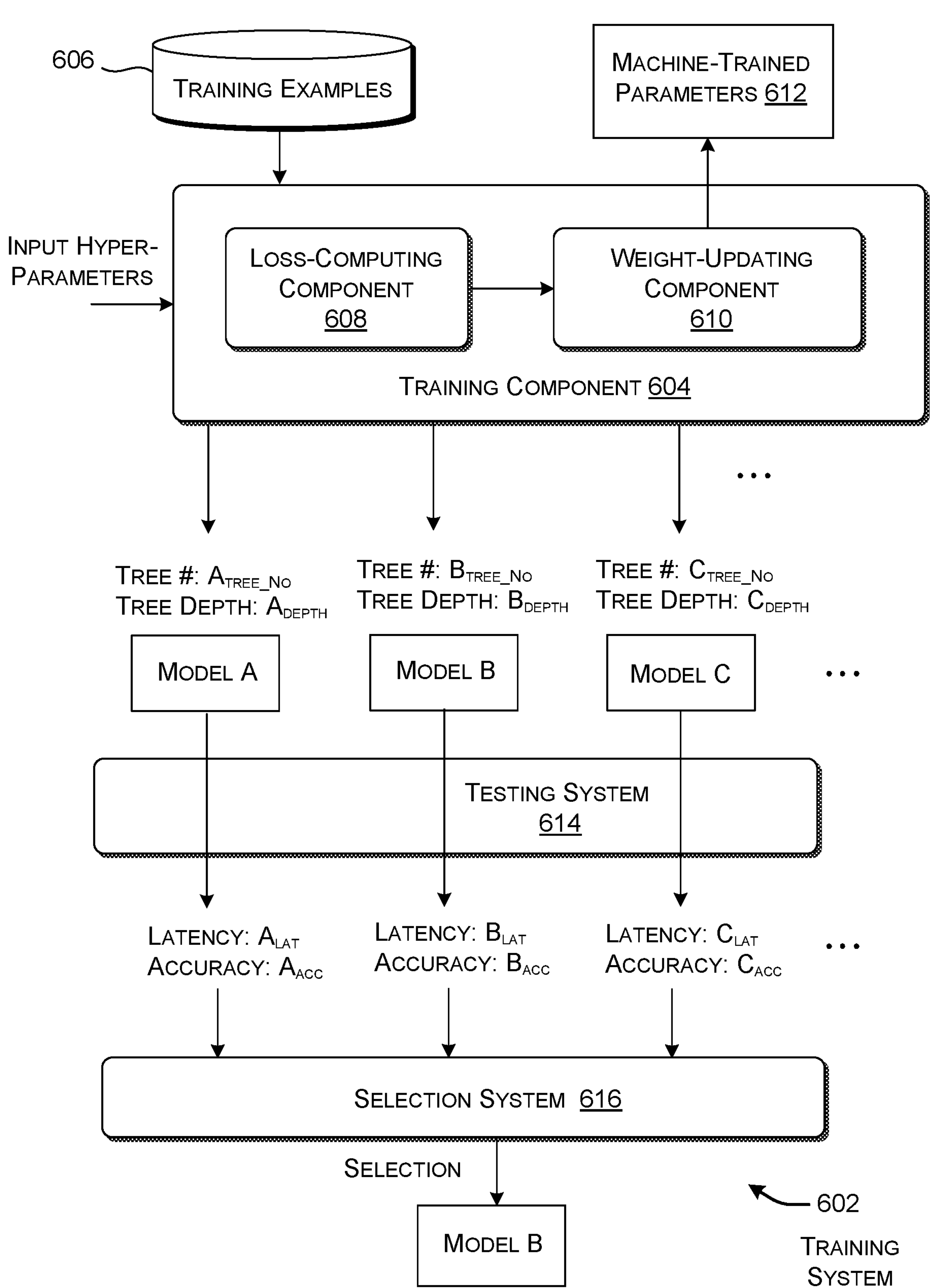
FIG. 6 shows an illustrative training system for training and evaluating plural component classification models.

FIG. 6 shows one example of a training system 602 for training and evaluating the ranking model 134. A training component 604 iteratively processes a collection a training examples in a data store 606. Each training example provides a query and a set of candidate descriptors that match the query, arranged in a correct order of relevance with respect to the query. The training component 604 performs its training using a loss-computing component 608 and a weight-updating component 610. The loss-computing component iteratively generates loss information based on a comparison of ground-truth labels associated with the training examples and model-predicted labels. The weight-updating component 610 iteratively updates a collection of weights 612 based on the loss information. The weight-updating component 610 performs this task, for instance, using stochastic gradient descent in combination of back propagation.

For the particular case of a gradient boosted decision tree, the training component 604 trains the component decision trees in a stepwise manner. For example, the training component 604: 1) generates weights for a first component decision tree; 2) assesses the gradient of the loss information associated with the first component decision tree; 3) and uses that loss information to update a second component decision tree. In other words, the second component decision tree attempts to correct the errors detected in the output results provided by the first component decision tree. A third component decision tree attempts to correct the errors in the second component decision tree, and so on. Background information on the general topic of boosted decision trees can be found in COADOU, Yann, "Boosted decision trees," arXiv, arXiv:2206.09645v1 [physics.data-an], Jun. 20, 2022, 46 pages.

In some implementations, the loss-computing component 608 assesses loss for the ranking model 134 using a pairwise strategy. In this approach, the loss-computing component 608 assesses an extent to which the ranking model 134 correctly indicates whether a first resource descriptor $R_i$ is more relevant than a second resource descriptor $R_j$, with respect to a given query. More specifically, assume that the ranking model 134 produces a score s associated with each candidate resource descriptor. A probability $P_{ij}$ that the first resource descriptor $R_i$ (having a score of $s_i$) should be ranked higher than the second candidate resource descriptor $R_j$ (having a score of $s_j$) is given by:

$$P_{ij} \equiv P(R_i \rhd R_i) = \frac{1}{1 + e^{-\sigma(s_i - s_j)}}. \quad (1)$$

In this equation, σ is a parameter that control the shape of a sigmoid. The symbol ⊳ indicates that $R_i$ is more relevant than $R_j$. Using cross entropy, the cost of a model's classification decision (as to whether the first candidate resource descriptor should be ranked higher than the second candidate resource descriptor) is given by:

$$L = -\bar{P}_{ij}\log P_{ij} - (1 - \bar{P}_{ij})\log(1 - P_{ij}). \quad (2)$$

In Equation (2), $\bar{P}_{ij}$ corresponds to a ground-truth label which indicates whether the first candidate resource descriptor is actually superior to the second candidate resource descriptor.

One type of ranking model that is trained using the pairwise strategy is the LambdaMART model provided by Microsoft Corporation of Redmond, Washington, also commercially referred to as the FastTree model. Background information on the general topic of the LambdaMART model is set forth in Christopher J. C. Burges, "From RankNet to LambdaRank to LambdaMART: An Overview," Microsoft Research Technical Report MSR-TR-2010-82, 19 pages. Other strategies for computing loss for a ranking model are the pointwise approach and the list-wise approach. The pointwise approach assigns a score to each candidate resource descriptor, independent of other candidate resource descriptors. The list-wise approach assigns a score to each candidate resource descriptor based on a consideration of all of the resource descriptors that match the query.

In other implementations, the ranking model 134 is implemented by another type of ranking model (besides the LambdaMART model). Other types of ranking models include the XGBoost model, a random forest classification model, etc.

In some examples, the training component 604 trains a set of candidate boosted decision tree models ("candidate models") for different hyper-parameter input settings, which are manually specified by a developer. More specifically, the training component 604 produces candidate models that have different numbers of component decision trees and/or different tree depths. A testing system 614 tests the performance of each of the candidate models with respect to latency and accuracy. The latency of a candidate model describes the amount of time that the candidate model requires on average to map instances of feature information to output results. The accuracy of the candidate model describes an extent to which output results produced by the candidate model match ground-truth output results.

A selection system 616 selects the candidate model that has the most optimal combination of latency and accuracy, compared to the other candidate models. More formally stated, the selection system 616 chooses a candidate model (if any) that has a latency that satisfies a first environment-specific threshold, and that has an accuracy that satisfies a second environment-specific threshold. In one case, for instance, the selection system 616 chooses a candidate model that has the smallest number of component decision trees, subject to the condition that the candidate model satisfies both the first threshold and the second threshold. In another case, the selection system 616 chooses the candidate model that has the smallest tree depth, subject to the condition that the candidate model satisfies the first threshold and the second threshold. In other cases, the selection system 616 assigns a single score to each candidate model that is based on an environment-specific weighted combination of its latency performance and accuracy. The selection system 616 then chooses the candidate model that has the most favorable (e.g., highest) score.

Note that the number of decisions that are required to be performed by the component decision trees grows with the depth of those component decision trees. The decisions require time to perform, which adds to the latency of the ranking model 134 as a whole. Further, the decisions require the use of resources (e.g., memory resources and processor resources). Hence, the testing system 602 reduces both latency and the consumption of resources by reducing the depth of the component classification trees.

Further note that, in the inference stage, the plural component decision trees of the ranking model 134 operate in parallel. However, as more component decision trees are added, the total latency increases. This is because the amount of time that is required to produce, transfer, and aggregate separate instances of score information increases with the number of component decision trees. Further, the amount of resources (e.g., memory resources and processor resources) grows with the number of component classification trees that are used. Hence, the testing system 602 reduces both latency and the consumption of resources by reducing the number of component classification trees used by the ranking model 134. In some examples, the testing system 602 produces a ranking model 134 having only 20 component decision trees, whereas a conventional boosted gradient classification often has hundreds or even thousands of decision trees.

Overall, the above-described approach enables even small local systems having resource constraints (e.g., memory and/or processor-related constraints) to effectively provide real-time or near real-time suggestions in response to queries entered by the user. The approach further enables accurate comparison of resource across resource types without resorting to ad hoc resource-specific rules, which are unreliable and difficult to maintain.

Further, the approach used by the computing system 102 is flexible and scalable with respect to changes within a particular environment, e.g., associated with the addition of new types of resources, the removal of existing types of resources and so on. In certain cases, a developer addresses these types of changes by creating new features, and then retraining the ranking model 134. In other instances, the ranking model 134 remains resilient to changes, and requires no updating; this is possible because the features that are used are flexible and scalable, as described above. In any event, the changes do not require the creation and maintenance of special rules to take account for the interrelationship among different kinds of resources; the ranking model 134 automatically infers these relationships. This factor reduces the development and maintenance costs associated with the computing system 102.

F. Illustrative Processes

Figure 7:
FIG. 7 is a flowchart that provides an overview of one manner of operation of the computing system of FIG. 1.

FIGS. 7 and 8 show two processes that represent an overview of the operation of the computing system of FIG. 1 and training system of FIG. 6. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 9 and 10.

More specifically, FIG. 7 shows a process 702 for suggesting resources within a particular environment, such as an enterprise environment. In some implementations, the local system 104 performs the process 702. In block 704, the local system 104 receives a query that is input via a search interface presentation (e.g., the search interface presentation 302). In block 706, the local system retrieves candidate resource descriptors, using a prefix tree data structure (e.g., the locally-implemented prefix tree data structure 116). The candidate resource descriptors are data items that describe candidate resources available within the particular environment. In some implementations, the candidate resources are drawn from plural heterogeneous groups of resources. In block 708, the local system 104 generates feature information that describes the candidate resource descriptors (and the underlying candidate resources). In block 710, the local system 104 uses a machine-trained ranking model (e.g., the ranking model 134) to generate scores associated with the candidate resource descriptors, based on the feature information. In block 712, the local system 104 generates output information that represents a set of resource descriptors that are selected based on the scores, for presentation via the search interface presentation.

FIG. 8 shows a process 802 for training a machine-trained ranking model (e.g., the ranking model 134). Assume that the ranking model includes an ensemble of plural component classification models. In block 804, the training component 604 produces plural candidate models based on a set of training examples, each having a particular number of component classification models and a particular tree depth. In block 806, the training component 604 assesses a prediction time and an accuracy of each candidate model, to provide test results, the prediction time describing an amount of time that is required to map the feature information to an output result. In block 808, the training system 602 ranks the candidate models based on prediction times and accuracies associated with the candidate models, and selects a candidate model that is ranked as most optimal.

G. Illustrative Computing Functionality

FIG. 9 shows computing equipment 902 that, in some implementations, is used to implement the computing system 102 of FIG. 1 and the training system 602 of FIG. 6. The computing equipment 902 includes a set of local devices 904 coupled to a set of servers 906 via a computer network 908. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 908 is implemented as a local area network, a wide area network (e.g., the Internet), one or more point-to-point links, or any combination thereof.

The bottom-most overlapping box in FIG. 9 indicates that the functionality of the computing system 102 and/or training system 602 is capable of being spread across the local devices 904 and/or the servers 906 in any manner. In one example, each local device implements the local system 104 of FIG. 1. The servers 906 implement the network-accessible data sources 122. In other implementations, any function attributed to the local system 104 can be performed in whole or in part by the servers 906.

FIG. 10 shows a computing system 1002 that, in some implementations, is used to implement any aspect of the mechanisms set forth in the above-described figures. For instance, in some implementations, the type of computing system 1002 shown in FIG. 10 is used to implement any local computing device or any server shown in FIG. 9. In all cases, the computing system 1002 represents a physical and tangible processing mechanism.

The computing system 1002 includes a processing system 1004 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1002 also includes computer-readable storage media 1006, corresponding to one or more computer-readable media hardware units. The computer-readable storage media 1006 retains any kind of information 1008, such as machine-readable instructions, settings, model weights, and/or other data. In some implementations, the computer-readable storage media 1006 includes one or more solid-state devices, one or more magnetic hard disks, one or more optical disks, magnetic tape, etc. Any instance of the computer-readable storage media 1006 uses any technology for storing and retrieving information. Further, any instance of the computer-readable storage media 1006 represents a fixed or removable unit of the computing system 1002. Further, any instance of the computer-readable storage media 1006 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1002 utilizes any instance of the computer-readable storage media 1006 in different ways. For example, in some implementations, any instance of the computer-readable storage media 1006 represents a hardware memory unit (such as random access memory (RAM)) for storing information during execution of a program by the computing system 1002, and/or a hardware storage unit (such as a hard disk) for retaining/archiving information on a more permanent basis. In the latter case, the computing system 1002 also includes one or more drive mechanisms 1010 (such as a hard drive mechanism) for storing and retrieving information from an instance of the computer-readable storage media 1006.

In some implementations, the computing system 1002 performs any of the functions described above when the processing system 1004 executes computer-readable instructions stored in any instance of the computer-readable storage media 1006. For instance, in some implementations, the computing system 1002 carries out computer-readable instructions to perform each block of the processes described with reference to FIGS. 7 and 8. FIG. 10 generally indicates that hardware logic circuitry 1012 includes any combination of the processing system 1004 and the computer-readable storage media 1006.

In addition, or alternatively, the processing system 1004 includes one or more other configurable logic units that perform operations using a collection of logic gates. For instance, in some implementations, the processing system 1004 includes a fixed configuration of hardware logic gates, e.g., that are created and set at the time of manufacture, and thereafter unalterable. In addition, or alternatively, the processing system 1004 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1004 effectively incorporates a storage device that stores computer-readable instructions, insofar as the configurable logic units are configured to execute the instructions and therefore embody or store these instructions.

In some cases (e.g., in the case in which the computing system 1002 represents a user computing device), the computing system 1002 also includes an input/output interface 1014 for receiving various inputs (via input devices 1016), and for providing various outputs (via output devices 1018). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1020 and an associated graphical user interface presentation (GUI) 1022. The display device 1020 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1002 also includes one or more network interfaces 1024 for exchanging data with other devices via one or more communication conduits 1026. One or more communication buses 1028 communicatively couple the above-described units together.

The communication conduit(s) 1026 is implemented in any manner, e.g., by a local area computer network, a wide area computer network (e.g., the Internet), point-to-point connections, or any combination thereof. The communication conduit(s) 1026 include any combination of hardwired links, wireless links, routers, gateway functionality, name servers, etc., governed by any protocol or combination of protocols.

FIG. 10 shows the computing system 1002 as being composed of a discrete collection of separate units. In some cases, the collection of units corresponds to discrete hardware units provided in a computing device chassis having any form factor. FIG. 10 shows illustrative form factors in its bottom portion. In other cases, the computing system 1002 includes a hardware logic unit that integrates the functions of two or more of the units shown in FIG. 10. For instance, in some implementations, the computing system 1002 includes a system on a chip (SoC or SOC), corresponding to an integrated circuit that combines the functions of two or more of the units shown in FIG. 10.

The following summary provides a set of illustrative examples of the technology set forth herein.

(A1) According to one aspect, a method (e.g., the process 702) is described, performed by a local system (e.g., the local system 104), for suggesting resources within a particular environment. The method includes: receiving (e.g., in block 704) a query that is input via a search interface presentation (e.g., the search interface presentation 302) provided by the local system; and retrieving (e.g., in block 706) candidate resource descriptors, using a prefix tree data structure (e.g., the prefix tree data structure 116), that match the query, the prefix tree data structure being provided by the local system. The candidate resource descriptors are data items that describe candidate resources available within the particular environment, the candidate resources being drawn from plural heterogeneous groups of resources. The method further includes: generating (e.g., in block 708) feature information that describes the candidate resource descriptors; using (e.g., in block 710) a machine-trained ranking model (e.g., the ranking model 132) to generate scores associated with the candidate resource descriptors, based on the feature information; and generating (e.g., 712) output information that represents a set of resource descriptors that are selected based on the scores, for presentation via the search interface presentation of the local system.

(A2) According to some implementations of the method of A1, the particular environment is an organization having members associated therewith.

(A3) According to some implementations of the methods of A1 or A2, further comprising sorting the candidate resource descriptors based on the scores, to produce sorted resource descriptors, wherein the generating draws the set from the sorted resource descriptors.

(A4) According to some implementations of any of the methods of A1-A3, the method is implemented by program logic, and wherein plural applications within the particular environment interact with the same program logic.

(A5) According to some implementations of the method of A4, the local system is a local computing device, and wherein one application that provides access to the program logic is a search utility provided by an operating system of the local computing device.

(A6) According to some implementations of the method of A4, one application that provides access to the program logic is a browser application that runs on the local system.

(A7) According to some implementations of any of the methods of A1-A6, the method further includes: retrieving resource descriptors from plural sources of resource descriptors; and generating the prefix tree data structure based on the resource descriptors that are retrieved from the plural sources, wherein at least some of the plural sources are network-accessible data stores.

(A8) According to some implementations of the method of A7, the method further includes updating the prefix tree data structure on a periodic and/or demand-driven basis by retrieving additional resource descriptors from the plural sources, and integrating the additional resource descriptors into the prefix tree data structure.

(A9) According to some implementations of any of the methods of A1-A8, the heterogeneous groups of resources include: files available within the particular environment; people associated with the particular environment; bookmarks for selected sites accessible to members associated with the particular environment; and applications available for use within the particular environment.

(A10) According to some implementations of any of the methods of A1-A9, the feature information for a particular resource descriptor and an associated particular resource includes: at least one feature that describes an extent to which the query matches the particular resource descriptor; at least one feature that describes a resource type associated with the particular resource; and at least one feature that describes a characteristic of the particular resource other than its resource type.

(A11) According to some implementations of any of the methods of A1-A10, the machine-trained ranking model includes an ensemble of plural component classification models.

(A12) According to some implementations of the method of All, the machine-trained ranking model is a boosted decision tree model, and the ensemble of classification models is an ensemble of component decision trees.

(A13) According to some implementations of the method of All, a training system produces machine-trained model by: producing plural candidate models based on a set of training examples, each having a particular number of component classification models and a particular tree depth; assessing a prediction time and an accuracy of each candidate model, to provide test results, the prediction time describing an amount of time that is required to map the feature information to an output result; and ranking the candidate models based on prediction times and accuracies associated with the candidate models, and selecting a candidate model that is ranked as most optimal.

(A14) According to some implementations of the method of A13, the selecting chooses a candidate model having a least number of candidate decision trees and/or a candidate model that has a smallest tree depth.

(A15) According to some implementations of the method of A13, the ranking is based on a score associated with each candidate model that is based on combination of a particular accuracy and a particular latency of the candidate model.

In yet another aspect, some implementations of the technology described herein include a computing system (e.g., the computing system 1802) that includes a processing system (e.g., the processing system 1804) having a processor. The computing system also includes a storage device (e.g., the computer-readable storage media 1806) for storing computer-readable instructions (e.g., information 1808). The processing system executes the computer-readable instructions to perform any of the methods described herein (e.g., any individual method of the methods of A1-A15).

In yet another aspect, some implementations of the technology described herein include a computer-readable storage medium (e.g., the computer-readable storage media 1806) for storing computer-readable instructions (e.g., the information 1808). A processing system (e.g., the processing system 1804) executes the computer-readable instructions to perform any of the operations described herein (e.g., the operations in any individual method of the methods of A1-A15).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1012 of FIG. 10. The term "logic" likewise encompasses various physical and tangible mechanisms for performing a task. For instance, each processing-related operation illustrated in the flowcharts of FIGS. 7 and 8 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a local system for suggesting resources within a particular environment, comprising:

receiving a query that is input via a search interface presentation provided by the local system;

retrieving candidate resource descriptors, using a prefix tree data structure, that match the query, the prefix tree data structure being provided by the local system, the candidate resource descriptors being data items that describe candidate resources available within the particular environment, the candidate resources being drawn from plural heterogeneous groups of resources;

generating feature information that describes the candidate resource descriptors;

using a machine-trained ranking model to generate scores associated with the candidate resource descriptors, based on the feature information; and generating output information that represents a set of resource descriptors that are selected based on the scores, for presentation via the search interface presentation of the local system.

2. The method of claim 1, wherein the particular environment is an organization having members associated therewith.

3. The method of claim 1, further comprising sorting the candidate resource descriptors based on the scores, to produce sorted resource descriptors, wherein the generating draws the set from the sorted resource descriptors.

4. The method of claim 1, wherein the method is implemented by program logic, and wherein plural applications within the particular environment interact with the same program logic.

5. The method of claim 4, wherein the local system is a local computing device, and wherein one application that provides access to the program logic is a search utility provided by an operating system of the local computing device.

6. The method of claim 4, wherein one application that provides access to the program logic is a browser application that runs on the local system.

7. The method of claim 1, further comprising:

retrieving resource descriptors from plural sources of resource descriptors; and generating the prefix tree data structure based on the resource descriptors that are retrieved from the plural sources, wherein at least some of the plural sources are network-accessible data stores.

8. The method of claim 7, further comprising updating the prefix tree data structure on a periodic and/or demand-driven basis by retrieving additional resource descriptors from the plural sources, and integrating the additional resource descriptors into the prefix tree data structure.

9. The method of claim 1, wherein the heterogeneous groups of resources include:

files available within the particular environment;

people associated with the particular environment;

bookmarks for selected sites accessible to members associated with the particular environment; and applications available for use within the particular environment.

10. The method of claim 1, wherein the feature information for a particular resource descriptor and an associated particular resource includes:

at least one feature that describes an extent to which the query matches the particular resource descriptor;

at least one feature that describes a resource type associated with the particular resource; and at least one feature that describes a characteristic of the particular resource other than its resource type.

11. The method of claim 1, wherein the machine-trained ranking model includes an ensemble of plural component classification models.

12. The method of claim 11, wherein the machine-trained ranking model is a boosted decision tree model, and the ensemble of classification models is an ensemble of component decision trees.

13. The method of claim 11, wherein a training system produces machine-trained model by:

producing plural candidate models based on a set of training examples, each having a particular number of component classification models and a particular tree depth;

assessing a prediction time and an accuracy of each candidate model, to provide test results, the prediction time describing an amount of time that is required to map the feature information to an output result; and ranking the candidate models based on prediction times and accuracies associated with the candidate models, and selecting a candidate model that is ranked as most optimal.

14. The method of claim 13, wherein the selecting chooses a candidate model having a least number of candidate decision trees and/or a candidate model that has a smallest tree depth.

15. The method of claim 13, wherein the ranking is based on a score associated with each candidate model that is based on combination of a particular accuracy and a particular latency of the candidate model.

16. A computing system for suggesting resources, comprising:

an instruction data store for storing computer-readable instructions;

a processing system for executing the computer-readable instructions in the data store, to perform operations comprising:

receiving a query that is input via a search interface presentation;

retrieving candidate resource descriptors, using a prefix tree data structure, that match the query, the candidate resource descriptors being data items that describe different kinds of candidate resources;

generating feature information that describes the candidate resource descriptors, the feature information for a particular resource descriptor and an associated particular resource including: at least one feature that describes an extent to which the query matches the particular resource descriptor; and at least one feature that describes a resource type associated with the particular resource;

using a machine-trained ranking model to generate scores associated with the candidate resource descriptors, based on the feature information, the scores enabling comparison across different types of resources; and generating output information that represents a set of resource descriptors selected based on the scores, for presentation via the search interface presentation.

17. The computing system of claim 16, wherein the machine-trained ranking model includes an ensemble of plural component classification models, and wherein the machine-trained ranking model is a boosted decision tree model, and the ensemble of classification models is an ensemble of component decision trees.

18. The computing system of claim 16, wherein the machine-trained ranking model includes an ensemble of plural component classification models, and wherein a training system produces machine-trained model by:

producing plural candidate models based on a set of training examples, each having a particular number of component classification models and a particular tree depth;

assessing a prediction time and an accuracy of each candidate model, to provide test results, the prediction time describing an amount of time that is required to map the feature information to an output result; and ranking the candidate models based on prediction times and accuracies associated with the candidate models, and selecting a candidate model that is ranked as most optimal.

19. A computer-readable storage medium for storing computer-readable instructions, a processing system executing the computer-readable instructions to perform operations, the operations comprising, receiving a query that is input via a search interface presentation;

retrieving candidate resource descriptors, using a prefix tree data structure, that match the query, the candidate resource descriptors being data items that describe different kinds candidate resources;

generating feature information that describes the candidate resource descriptors;

using a machine-trained ranking model to generate scores associated with the candidate resource descriptors, based on the feature information; and generating output information that represents a set of resource descriptors that are selected based on the scores, for presentation via the search interface presentation, wherein the machine-trained ranking model includes an ensemble of plural component classification models, and wherein a training system produces machine-trained model by:

producing plural candidate models based on a set of training examples, each having a particular number of component classification models and a particular tree depth;

assessing a prediction time and an accuracy of each candidate model, to provide test results, the prediction time describing an amount of time that is required to map the feature information to an output result; and ranking the candidate models based on prediction times and accuracies associated with the candidate models, and selecting a candidate model that is ranked as most optimal.

20. The computer-readable storage medium of claim 19, wherein the different kinds of resources include:

files available within the particular environment;

people associated with the particular environment;

bookmarks for selected sites accessible to members associated with the particular environment; and applications available for use within the particular environment.

* * * * *